(12) United States Patent
Lise (10) Patent No.: US 8,685,129 B2
(45) Date of Patent: Apr. 1, 2014

(54) FRAMED AIR FILTER AND METHOD OF MAKING

(75) Inventor: Jonathan M. Lise, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 238 days.

(21) Appl. No.: 13/159,998

(22) Filed: Jun. 14, 2011

(65) Prior Publication Data

US 2012/0317944 A1 Dec. 20, 2012

(51) Int. Cl.
*B01D 39/00* (2006.01)

(52) U.S. Cl.
USPC .................. 55/499; 55/492; 55/495; 55/497; 55/501

(58) Field of Classification Search
USPC ............ 55/495, 499, 501, 497, 511, DIG. 31, 55/48–487, 490–492
See application file for complete search history.

(56) References Cited

U.S. PATENT DOCUMENTS

| | | | |
|---|---|---|---|
| 2,160,003 A | 10/1939 | Games | |
| 2,965,197 A | 12/1960 | Dow | |
| 3,793,692 A | 2/1974 | Tate | |
| 4,105,423 A * | 8/1978 | Latakas et al. | 55/501 |
| 4,177,050 A | 12/1979 | Culbert | |
| 4,518,402 A | 5/1985 | Dargel | |
| 5,037,455 A | 8/1991 | Scheineson | |
| 5,342,423 A | 8/1994 | Taft | |
| 5,427,309 A | 6/1995 | Voss | |
| 5,476,526 A | 12/1995 | Attemeyer | |
| 5,744,036 A | 4/1998 | Choi | |
| 5,782,944 A | 7/1998 | Justice | |
| D397,777 S | 9/1998 | Mack | |
| 5,906,677 A | 5/1999 | Dudley | |
| 6,152,980 A | 11/2000 | Culwell | |
| 6,164,457 A | 12/2000 | Schlor | |
| 6,521,011 B1 | 2/2003 | Sundet | |
| 6,793,703 B1 | 9/2004 | Sledge | |
| 6,846,342 B2 | 1/2005 | Mertz | |
| 7,156,891 B2 | 1/2007 | Winters | |
| D544,949 S | 6/2007 | Winters | |
| 7,537,632 B2 * | 5/2009 | Miller et al. | 55/501 |
| 7,588,617 B2 | 9/2009 | Kyllonen | |
| 7,727,299 B2 | 6/2010 | Knowles | |
| 7,776,123 B2 | 8/2010 | Lawrence | |
| 7,896,940 B2 | 3/2011 | Sundet | |
| 2003/0172633 A1 | 9/2003 | Duffy | |
| 2006/0283162 A1 | 12/2006 | Dent | |
| 2007/0289273 A1 * | 12/2007 | Boyd | 55/497 |
| 2007/0294988 A1 | 12/2007 | Miller | |
| 2008/0000349 A1 * | 1/2008 | Pape et al. | 95/23 |
| 2009/0126326 A1 | 5/2009 | McClellan | |
| 2010/0005765 A1 | 1/2010 | Kyllonen | |
| 2010/0269468 A1 | 10/2010 | Crabtree | |
| 2010/0270204 A1 | 10/2010 | Sinclair | |
| 2010/0300052 A1 | 12/2010 | Porter | |

FOREIGN PATENT DOCUMENTS

JP 2000/070642 3/2000

* cited by examiner

*Primary Examiner* — Jason M Greene
*Assistant Examiner* — Karla Hawkins
(74) *Attorney, Agent, or Firm* — Kenneth B. Wood (57) ABSTRACT

A framed air filter and method of making. The framed air filter includes a non-self-supporting air filter media with a generally rectangular perimeter with four major edges, a support frame comprised of four support frame portions each portion being mounted on one of the four major edges of the non-self-supporting air filter media, and a support grill that is attached to each of the four portions of the support frame but that is not integral with any portion of the support frame.

14 Claims, 4 Drawing Sheets

FRAMED AIR FILTER AND METHOD OF MAKING

BACKGROUND

Air filters are commonly used in forced air systems, e.g. residential heating and air-conditioning systems, in order to remove dust and dirt particles and the like.

SUMMARY

Herein is disclosed a framed air filter and method of making. The framed air filter comprises a non-self-supporting air filter media comprising a generally rectangular perimeter with four major edges, a support frame comprised of four support frame portions each portion being mounted on one of the four major edges of the air filter media, and a support grill that is attached to each of the four portions of the support frame but that is not integral with any portion of the support frame.

Thus in one aspect, herein is disclosed a framed air filter, comprising: a non-self-supporting air filter media comprising an upstream side and a downstream side and comprising a generally rectangular perimeter comprising four major edges; a support frame comprised of four support frame portions each portion being mounted on one of the four major edges of the non-self-supporting air filter media; and, a support grill adjacent the downstream side of the non-self-supporting air filter media and consisting of a single perforate sheet that is not integral with any portion of the support frame and that is attached to each of the four portions of the support frame.

Thus in another aspect, herein is disclosed a method of making a framed air filter, comprising: attaching outwardmost portions of a support grill to portions of at least two support frame pieces to which the outwardmost portions of the support grill are respectively adjacent and in overlapping relation, so as to form an attached support grill; positioning a non-self-supporting air filter media adjacent to, and in overlapping relation with, the attached support grill, and attaching at least outwardmost portions of the non-self-supporting air filter media to the attached support grill and/or to the at least two support frame pieces; folding the at least two support frame pieces around the outwardmost portion of the non-self-supporting air filter media so as to form channel frame pieces each with a sidewall and an upstream flange and a downstream flange; and, attaching each support frame piece to a neighboring support frame piece to form a frame.

Thus in another aspect, herein is disclosed a method of making a framed air filter, comprising: positioning a support frame piece so that it comprises four edge portions arranged collectively in a generally rectangular shape; attaching outwardmost portions of a support grill to portions of the support frame piece to which the outwardmost portions of the support grill are respectively adjacent and in overlapping relation, so as to form an attached support grill; positioning a non-self-supporting air filter media adjacent to, and in overlapping relation with, the attached support grill, and attaching at least outwardmost portions of the non-self-supporting air filter media to the attached support grill and/or to the support frame piece; folding the support frame piece around the outwardmost portion of the non-self-supporting air filter media so as to form a sidewall and an upstream flange and a downstream flange; and, attaching a first terminal end of the support frame piece to a second terminal end of the support frame piece.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

DEFINITIONS

The term "non-self-supporting" denotes an air filter media that is not capable, in the absence of a support frame and a support grill, of withstanding the forces encountered due to forced-air flow in a typical residential HVAC system. Specifically, non-self-supporting denotes an air filter media that without a support frame and a support grill, when placed in a conventional holding fixture of a residential HVAC system, is unable to withstand the forces developed when air impinges the upstream side of the air filter media so as to develop a pressure of at least 0.4 inches of water, without the air filter media failing (i.e., unacceptably collapsing, rupturing, deforming or becoming dislodged). Such non-self-supporting air filter media by definition does not encompass self-supporting air filter media (such as that described e.g. in U.S. Pat. Nos. 7,896,940 and 6,521,011, both to Sundet et al.), for which the use of e.g. a frame is described as optional.

The term "support grill" means a perforate sheet that is attached to a support frame and is positioned adjacent to, and downstream of and in overlapping relation with, a non-self-supporting air filter media, in order to (in combination with the support frame) prevent the air filter media from unacceptably deforming or rupturing when under pressure of forced air flow. Such a support grill is specifically defined herein as not being integral with the support frame, but is rather a single sheet that is formed separately from the support frame and that is attached to the support frame. Such a support grill comprises through-perforations sufficient to permit adequate air flow through the air filter media.

The term "upstream" denotes the side of an air filter against which forced air flows when the filter is positioned within a forced-air handling system (e.g., a residential HVAC system); the term "downstream" denotes the side of an air filter through which filtered air exits the filter.

Although terms such as "top", bottom", "upper", lower", "under", "over", "front", "back", "up" and "down", and "first" and "second" may be used in this disclosure, it should be understood that those terms are used in their relative sense only unless otherwise noted. Terms such as "outward", "outwardmost", "outwardly", and the like, mean in a direction generally along the overall plane of the air filter media away from the geometric center of the air filter media. Terms such as "inward", "inwardmost", "inwardly", and the like, mean in a direction generally along the overall plane of the air filter media toward the geometric center of the air filter media. Terms such as "inner" denote a surface (of a component such as e.g. a support frame or support grill) that faces toward the air filter media; terms such as "outer" denote a surface that faces away from the air filter media.

The term "overlapping relation" denotes a configuration in which two substrates overlap each other, and permits at least one additional substrate (e.g. a layer of adhesive) to be in between the two overlapping substrates.

DETAILED DESCRIPTION

Figure 1:
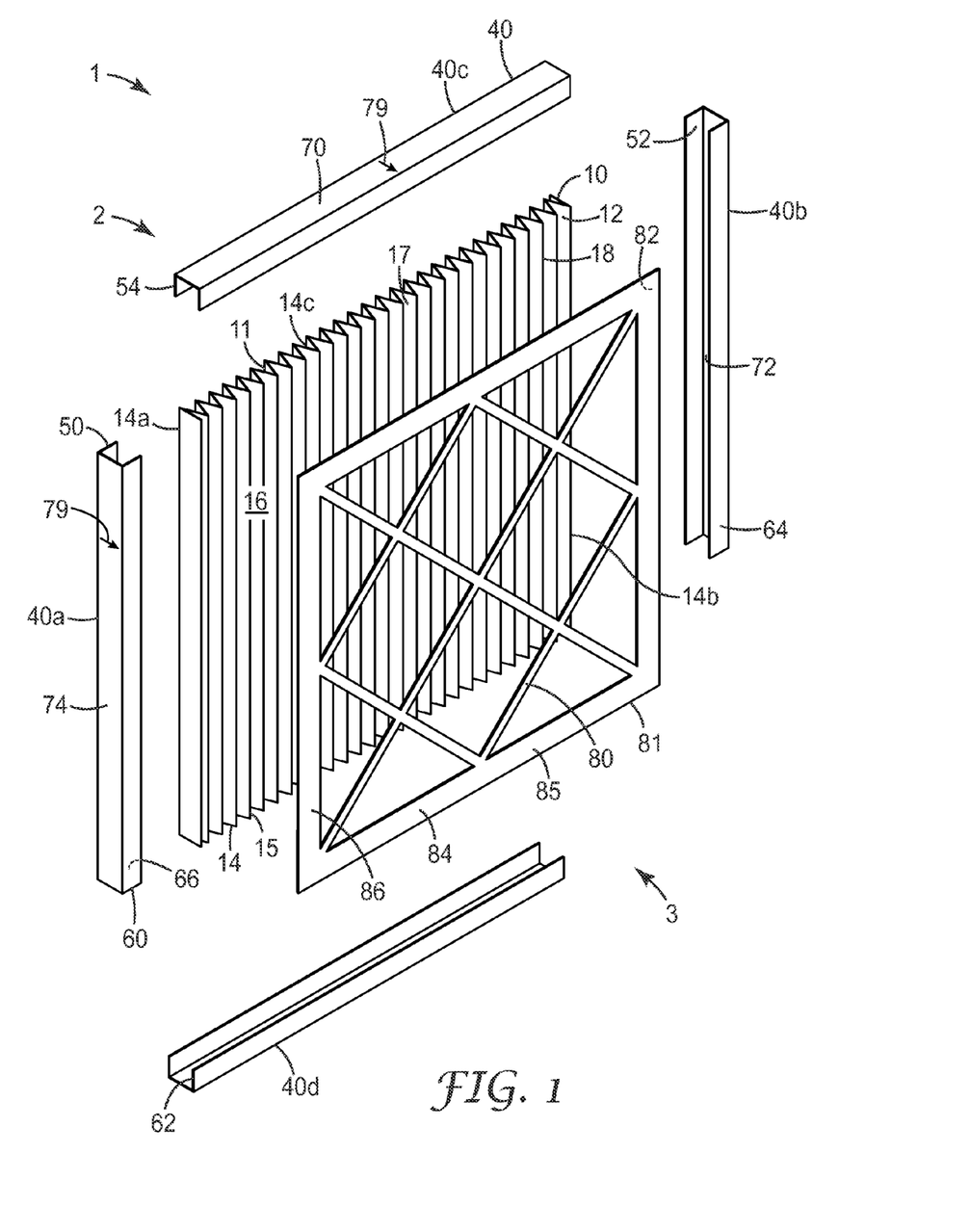
FIG. 1 is a perspective exploded view of an exemplary framed air filter as disclosed herein, viewed from the downstream side of the framed air filter.
Figure 2:
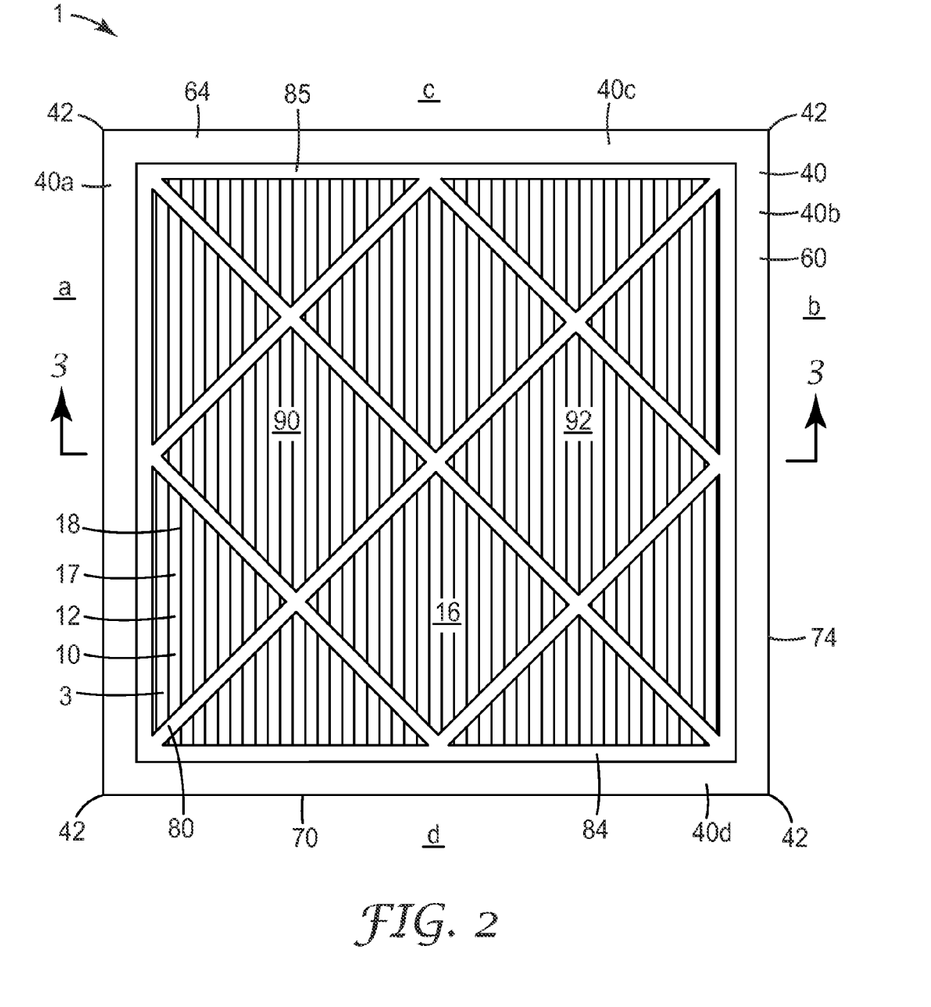
FIG. 2 is a plan view of an exemplary framed air filter as disclosed herein, viewed from the downstream side of the framed air filter.
Figure 3:
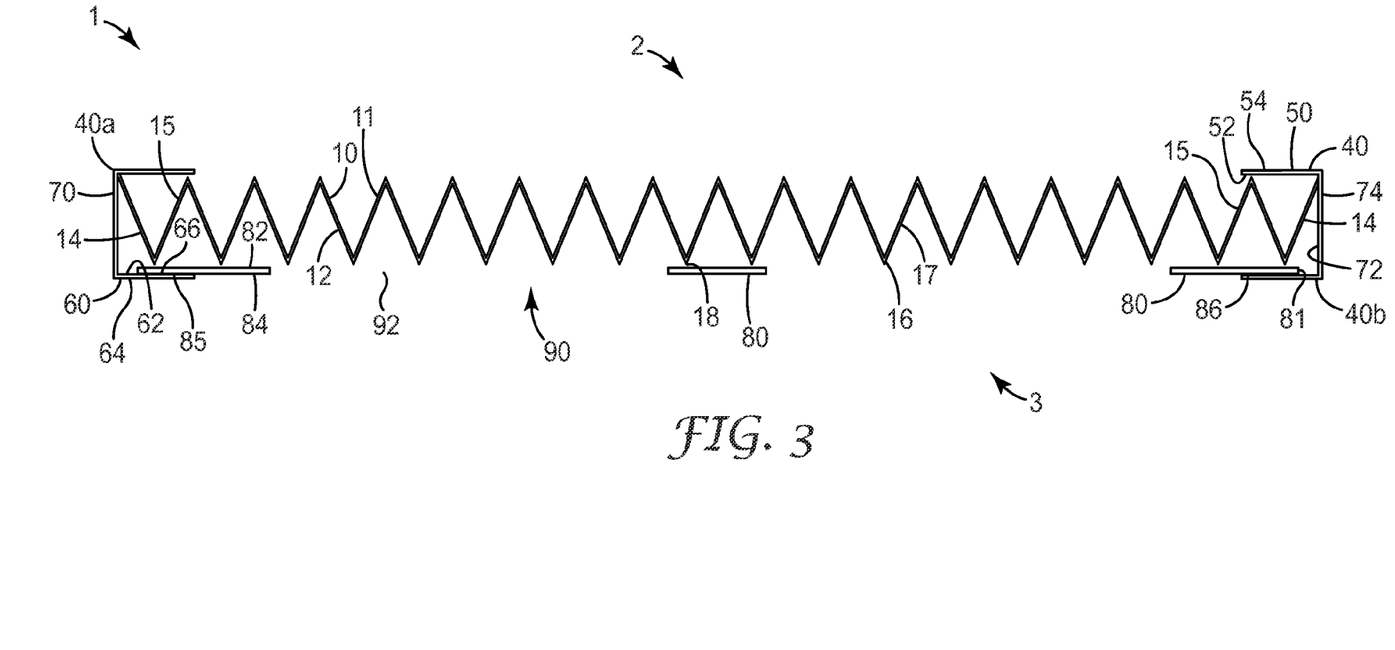
FIG. 3 is a cross-sectional slice view of the framed air filter of FIG. 2, taken along line 3-3.

Shown in FIG. 1 in perspective exploded view, and in FIG. 2 in plan view, is an exemplary framed air filter 1 as disclosed herein, viewed from the downstream side of the framed air filter. FIG. 3 shows a cross-sectional slice view of the exemplary air filter of FIG. 2, taken along line 3-3 of FIG. 2. Framed air filter 1 comprises non-self-supporting air filter media 10, support frame 40 mounted on the perimeter of air filter media 10, and support grill 80 that is positioned adjacent to, and downstream of and in overlapping relation with, air filter media 10, and that is attached to support frame 40. Air filter 1 may conveniently be generally rectangular in shape (which includes square shapes), with air filter media 10 likewise being generally rectangular and with support frame 40 taking the form of a rectangular frame mounted to (e.g., attached to) the perimeter of air filter media 10. For convenience in describing such generally rectangular geometry, the four individual (e.g., edge) portions of air filter 1, air filter media 10, support frame 40, and/or support grill 80 may occasionally be referred to herein by a lettered subscript (a, b, c, or d). Although not all such components of these structures are so labeled in the Figures (in order to enhance the clarity of the Figures), it will be understood that all such designations may be applied to all such components.

Air filter 1 comprises non-self-supporting air filter media 10, with an upstream surface 11 on upstream side 2 of air filter 1, and with a downstream surface 12 on downstream side 3 of air filter 1. Non-self-supporting air filter media 10 comprises generally rectangular perimeter 14 (e.g., with major edges 14a, 14b, 14c and 14d) which may be shaped and sized to match the shape and size of frame 40. (Such a generally rectangular perimeter does not preclude irregularities, notches, chamfered or angled corners, or the like, in the perimeter edge of the air filter media.) Air filter media 10 is typically sheet-like, with a length and width that are greater than the thickness of the air filter media and with an overall planar configuration (even if pleated). Although FIGS. 1-3 illustrate an air filter 1 comprising pleated air filter media 10, any suitable non-pleated (e.g., generally flat) non-self-supporting air filter media 10 may be used. Air filter media 10, whether pleated or in substantially flat state or otherwise, may comprise open cell structures, porous layers, or the like, any of which can comprise any suitable material, chosen from e.g. porous foams, non-wovens, papers, fiberglass, or the like, alone or in combination with one another. In some embodiments, non-self-supporting air filter media 10 comprises a pleated material. (In specific embodiments, air filter media 10 may comprise an electret-comprising nonwoven material.) In some embodiments, air filter media 10 may comprise a pleated material that comprises a highly open wire mesh or screen that is bonded to the air filter media in order to enhance the pleatability thereof and that is pleated along with the air filter media itself.

As defined above, non-self-supporting means that air filter media 10 without a support frame and a support grill, when placed in a conventional holding fixture of a residential HVAC system, is unable to withstand the forces developed when air impinges the upstream side of the air filter media so as to develop a pressure of at least 0.4 inches of water, without the air filter media failing (i.e., unacceptably collapsing, rupturing, deforming or becoming dislodged). Such a requirement may be tested e.g. by placing a filter media (without a support frame or grill) of nominal size approximately 16 inches by 25 inches, into an opening of a frame tester as described later herein, the opening of the frame tester comprising flanges which support the perimeter edges of the filter media to an overlap of approximately 0.5 inch (inwardly from the edge of the media) on each side, and using the frame tester to develop a pressure differential such that higher air pressure is applied to the upstream surface of the filter media. In such testing, non-self-supporting filter media of the general type described in the Examples herein typically failed (e.g., deformed (bowed) in a downstream direction so as to become dislodged from the frame tester opening) at an applied air pressure of about 0.2-0.3 inches of water. In contrast, a self-supporting filter media of the type available from 3M Company, St. Paul, Minn., under the trade designation FILTRETE ULTRA ALLERGEN 1500, excepting with the perimeter frame removed, typically survived an applied air pressure of up to 1.0 inch of water with little or no deformation.

Support frame 40 is mounted on perimeter 14 of air filter media 10. In some embodiments, frame 40 comprises a channel frame (e.g., a generally U-shaped frame) comprising a downstream flange 60 at least an inwardmost portion of which is positioned in overlapping relation to, and downstream of, at least perimeter 14 of air filter media 10, as may be seen most easily e.g. in FIG. 3. (Often, it may be convenient for downstream flange 60 to overlap a border portion 15 of air filter media 10 that extends e.g. about 1-2 cm inwardly toward the geographic center of air filter media 10 from perimeter 14 of air filter media 10, in an arrangement of the general type shown in FIG. 3). Downstream flange 60 comprises inner surface 62 and outer surface 64. Channel frame 40 may further comprise upstream flange 50, at least an inwardmost portion of which is positioned in overlapping relation to, and upstream of, at least perimeter 14 of air filter media 10. (Upstream flange 50 may overlap a border portion 15 of air filter media, to the same or to a different extent as does downstream flange 60). Upstream flange 50 comprises inner surface 52 and outer surface 54. U-shaped channel frame 40 may further comprise sidewall 70, which outwardly bounds air filter media 10. (Sidewall 70 may thus comprise the base of a U-shaped frame, with upstream and downstream flanges 50 and 60 comprising the arms of the U-shaped frame). Sidewall 70 comprises inner (air filter media-facing) surface 72 and outer surface 74. In various embodiments, air filter media 10 (e.g., perimeter 14 thereof and/or a border portion 15 proximate thereto) may be attached to any or all of sidewall 70, downstream flange 60 and/or upstream flange 5, of support frame 40. For example, air filter media 10 may be attached to any or all of inner surface 72 of sidewall 70, inner surface 52 of upstream flange 50, and/or inner surface 62 of downstream flange 60. Such attachment may be by any suitable means, e.g. one or more adhesives as described elsewhere herein.

For convenience of illustration, with reference to FIGS. 1 and 2 frame 40 is designated as comprising portions 40a, 40b, 40c and 40d, which are respectively located on (e.g. mounted onto) portions 14a, 14b, 14c, and 14d of generally rectangular perimeter 14 of air filter media 10. It will be understood that the various frame components (e.g., upstream flange 50, downstream flange 60, and sidewall 70) may likewise comprise individual portions a-d, located respectively on major edges a-d of air filter media 10 (although most such individual portions of frame components are not individually labeled in the Figures, in order to enhance the clarity of the Figures). Moreover, it will be understood that the exploded-view depiction of individual frame portions 40a-d in FIG. 1 is provided for convenience of illustration and is not meant to imply that each portion 40a, 40b, 40c or 40d necessarily corresponds to a specific frame piece from which frame 40 is constructed. In other words, the FIG. 1 illustration does not imply that frame 40 must be made from four separate frame pieces, nor that each frame piece must form exactly one edge portion of the finished frame, although either or both of these may be done if convenient. In fact, in certain embodiments disclosed herein, frame 40 may be made from (assembled from) two L-shaped elongated frame pieces. For example, in some embodiments two frame portions, e.g. 40a and 40c, may be supplied by a single integral L-shaped piece, with two other frame portions, e.g. 40b and 40d, likewise being supplied by a single integral L-shaped piece, the two L-shaped pieces being attached to each other (e.g., at their terminal ends) to collectively form frame 40. (In embodiments in which filter 1 is generally square, the two arms of each L-shaped piece may be of generally equal length). Additionally, the FIG. 1 illustration does not limit the manner in which a frame piece (e.g., a terminal end thereof) may be attached to a neighboring frame piece to form frame 40.

Individual frame pieces which may be assembled together to collectively form frame 40 may be attached to each other (e.g., at terminal ends of the individual elongated pieces) by any suitable fastening mechanism (e.g., adhesives, mechanical fasteners (e.g., staples and the like), and so on). The frame pieces may comprise any suitable ancillary components (e.g., tabs, slots, flanges, etc.) as may facilitate the attachment of the individual frame pieces to each other. Often, it may be convenient that the individual frame pieces are attached to each other at locations that are at, or proximate, corners 42 of the assembled frame 40, but other attachment locations can be used if desired. Frame 40 and individual frame pieces used to form frame 40 may be made of any suitable material, e.g. paperboard, plastic, metal and so on.

Support grill 80 consists of a single sheet-like perforate piece that is positioned adjacent to, and in overlapping relation with and downstream of, non-self-supporting air filter media 10 in order to support (in combination with support frame 40) air filter media 10 from unacceptably deforming or rupturing when under pressure due to forced air. At least some portion of support grill 80 (e.g., perimeter 81 and/or a portion of support grill 80 proximate thereto) is attached to each of the four portions (e.g., portions 40a, 40b, 40c and 40d) of frame 40 located respectively on sides 14a, 14b, 14c and 14d of generally rectangular air filter media 10.

Support grill 80 comprises through-perforations 92 sufficient to permit adequate air flow through the air filter media, at least in inwardmost area 90 of support grill 80 that is in overlapping relation with portion 16 of air filter media 10 that is not blocked or obstructed by frame 40. Such through-perforations 92 may comprise e.g. die-cut openings (of any suitable size and shape); or, support grill 80 may, as made, contain solid portions (e.g., strips as shown in FIG. 1) with empty spaces 92 therebetween. Support grill 80 is a single sheet-like piece, that can be made of any suitable material, e.g. paperboard, plastic, metal and so on. In certain embodiments, support grill 80 and frame 40 may be made of the same material (although they are not integral with each other, as emphasized herein). In specific embodiments, support grill 80 and frame 40 are both made of paperboard. In particular embodiments, support grill 80 and frame 40 are both made of paperboard of thickness in the range of 24-30 thousandths of an inch.

As stated, support grill 80 is not integral with support frame 40 or with any portion of support frame 40. That is, support grill 80 is not formed in the same operation with frame 40 nor connected to frame 40 as made. Nor does support grill 80 itself replace or supply any outermost portion of a support frame (i.e., a sidewall that outwardly bounds at least a portion of air filter media 10 and that provides at least a portion of an outermost sidewall surface 74 of frame 40 of filter 1). Furthermore, support grill 80 does not encompass items such as reinforcing strips, beams, members, sheets, scrims, strands, filaments, etc., as may be attached to a self-supporting air filter media (e.g., for purposes of maintaining a desired pleat spacing in a pleated self-supporting air filter media) before such self-supporting air filter media is optionally attached to a frame. (Those of ordinary skill will appreciate that in the case of a self-supporting air filter media, a frame may be provided primarily for e.g. decorative reasons and conventionally is not thought of as interacting with a support grill in the manner described herein to support a non-self-supporting air filter media against air flow).

Support grill 80 may be sized and shaped so as to reside within an area outwardly bounded by sidewall 70 of frame 40, and so that attachment of support grill 80 to frame 40 is facilitated. It may be convenient, for example, to attach support grill 80 to frame 40 by way of attaching support grill 80 to downstream flange 60 of frame 40. In embodiments of this general design, at least some portion 86 of perimeter 14 of support grill 80 and/or a portion of support grill 80 proximate thereto may be located in overlapping relation with at least some portion 66 of downstream flange 60 of frame 40, as seen e.g. in FIG. 3. In such embodiments, support grill 80 and frame 40 may be attached to each other (e.g., by way of one or more adhesives, mechanical fasteners, etc.) at least in some locations of the portions 66 and 86 that are in overlapping relation. In some embodiments, such attachment may be performed by way of a layer of adhesive located between inner surface 62 of portion 66 of downstream flange 60, and outer surface 84 of portion 86 of support grill 80. In some embodiments, such attachment may be by way of mechanical fasteners (e.g., one or more staples). In some embodiments, a combination of both adhesive(s) and mechanical fastener(s) may be used.

In some embodiments, support grill 80 may comprise continuous border frame 85 (which if present will be part of the single piece constituting support grill 80) as seen e.g. in FIG. 1. The width (i.e. in an inward-outward direction along the overall plane of air filter media 10) of continuous border frame 85 may be chosen e.g. so as to provide sufficient area of overlap with downstream flange 60 of frame 40 to permit bonding thereto. If desired, the dimensions of continuous border frame 85 may be designed so as to provide that at least an outermost portion of continuous border frame 85 protrudes inwardly (toward the geometric center of air filter media 10) beyond the inward edge of downstream flange 60 (as illustrated in exemplary manner in the design of FIG. 2). In specific embodiments, portions of continuous border frame 85 of support grill 80 may extend inwardly beyond the entirety of the inward edge of downstream flange 60 of frame

40, again as shown in FIG. 2. The width of continuous border frame 85 may be constant (around the perimeter of support grill 80), or may vary.

In various embodiments, air filter media 10 may be attached to support grill 80 either instead of, or in addition to, being attached to frame 40. In some embodiments, such attachment may be at perimeter of 14 of air filter media 10, and/or at border portion 15 of air filter media 10 that is proximate perimeter 14. In some embodiments, air filter media 10 may be additionally attached to support grill 80 at least at some locations within perforated area 90 of support grill 80 (and within area 16 of air filter media 10 that is in overlapping relation with perforated area 90 of support grill 80). Such additional attachment may be achieved e.g. by providing adhesive over at least some, or all of inner surface 82 of support grill 80 within area 90.

In cases in which air filter media 10 is a pleated air filter media comprising pleats 17 with downstream pleat tips 18 thereof, in some embodiments at least pleat tips 18 in areas in which they are adjacent to, and/or in contact with, support grill 80 (e.g., as exemplified by pleat tip 18 depicted in FIG. 3) may be bonded to support grill 80 (e.g., to inner surface 82 thereof).

In some embodiments, no other reinforcing structures, strips, beams, members, sheets, scrims, strands, filaments, or the like are present on downstream side 3 of filter 1, except for single support grill 80 itself (This requirement does not preclude the possibility of the air filter media itself comprising a pleatability-enhancing highly open wire mesh or screen that is bonded to the air filter media and is pleated along with the air filter media, as referred to earlier). In some embodiments, a support grill may be provided on the upstream side 2 of filter 1. Such a support grill may be similar to or identical with the designs already presented herein, except for e.g. being bonded to upstream flange 50 of frame 40 rather than to downstream flange 60 of frame 40. In some embodiments, the entirety of support grill 80 may consist of a single planar sheet that does not contain any folded portions (e.g., edges or flanges).

It has heretofore been common to use a so-called box frame to support non-self-supporting air filter media in the production of air filters e.g. for residential HVAC use. Such a box frame is conventionally made from a single piece of material, which comprises a through-perforated central portion (e.g., with sub-portions removed therefrom by die-cutting) and comprises edge flanges that are folded around the perimeter of a generally rectangular piece of air filter media to form a frame comprising e.g. a sidewall, an upstream flange, and a downstream flange. Such conventional box frames and methods of incorporating them into air filters are described e.g. in U.S. Patent Application Publication 2007/0294988 to Miller et al. The present design may provide several advantages over such box frames. For example, printed information (e.g. airflow information, i.e. an arrow or other such indicator of the direction of air flow, such as arrows 79 shown in FIG. 1) is customarily provided on the outer surface of the sidewall of a filter frame in order that a user know in which orientation to insert the air filter into an HVAC system for air to flow through the filter in the proper direction. The use of a conventional box frame may require such information to be printed on a large piece of material (e.g., at least as large as the area of the filter plus the thickness of the frame). In contrast, the present use of a separate support grill that is attached to a support frame allows that, if desired, only the components of the frame itself need be subjected to a printing process. This can substantially reduce the cost and complexity of the printing process.

Additionally, it has been found that the use of a separate support grill in combination with a support frame to all four sides (i.e., edge portions) of which the support grill is attached, may provide an air filter with frame strength that is equal to or greater than that provided by a conventional box frame. Unexpectedly, this may be achieved even though the support frame may be made of a material that is thinner than that used in a conventional box frame, as demonstrated in the Examples herein.

Framed air filter 1 may be of any convenient size. It will be appreciated, of course, that the support offered by a support grill that is attached to all four sides of a rectangular support frame may play an enhanced role as the size of the framed air filter increases. As such, in some embodiments the size of framed air filter 1 is at least 40 cm by 40 cm, as measured between two diagonally-opposing corners (e.g., as measured between two diagonally-opposing corners 42 of framed air filter 1 of FIG. 2).

Figure 4:
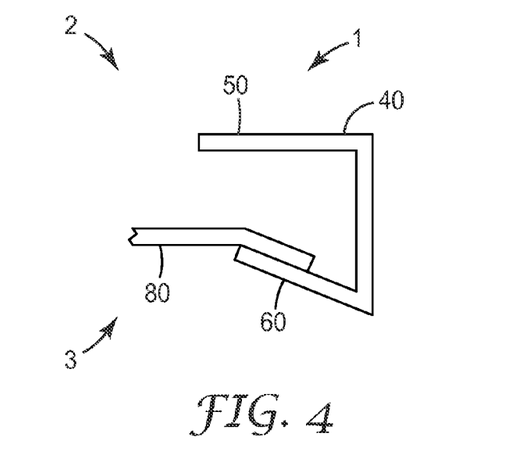
FIG. 4 is a cross-sectional slice view of a portion of a framed air filter comprising an exemplary pinch frame configuration.

In some embodiments, generally all portions of downstream flange 60 and upstream flange 50 of frame 40 may be generally parallel to each other. In other embodiments, frame 40 may comprise a pinch frame. In such embodiments, at least a portion of a flange (e.g., downstream flange 60) that is distal to sidewall 70 of frame 40, may be pinched toward the other flange (e.g., upstream flange 50) of the frame, as shown in exemplary manner in FIG. 4 (with some components omitted for ease of presentation). In other embodiments, a distal portion of an upstream flange 50 may be pinched toward a downstream flange 60. Such a pinched flange may provide a truss construction that enhances the support provided by frame 40.

Figure 5:
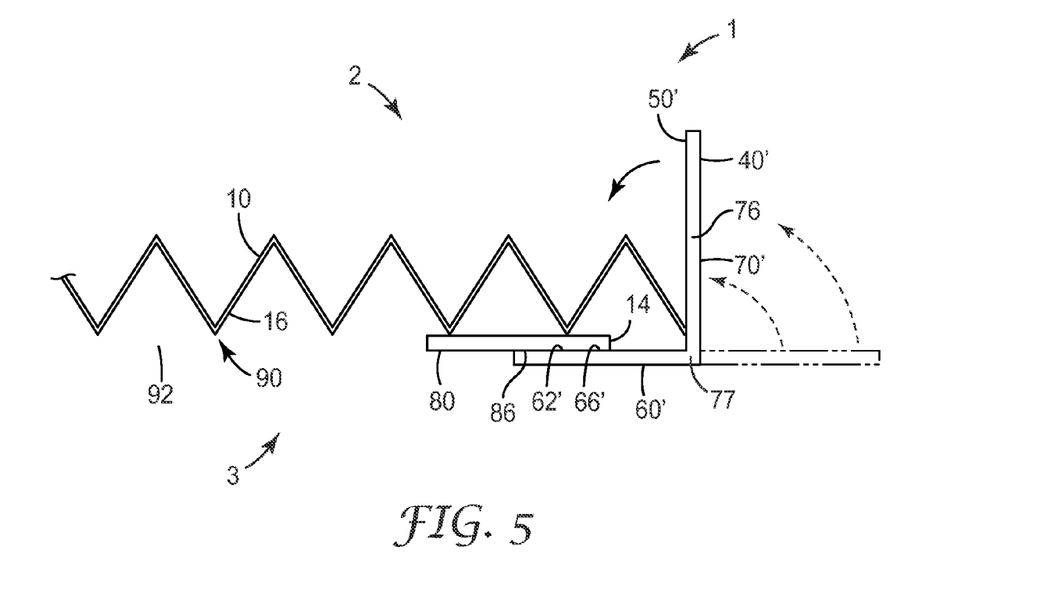
FIG. 5 is a cross-sectional slice view of a portion of a partially assembled exemplary framed air filter.

Air filter 1 may be manufactured by the following exemplary method. With reference to FIG. 5, two or more frame pieces 40' may be positioned in a holding device (e.g., a fixture) so as to collectively form a rectangular frame precursor. While it may be convenient to provide four filter frame pieces 40' which generally correspond to portions 40a-d of a finished frame 40 e.g. in the general manner depicted in FIG. 1, it should be emphasized that this need not necessarily be the case. For example, in some embodiments, two separate L-shaped frame pieces may be provided. Each L-shaped piece may be formed as a rigid L-shaped piece to be supplied to the assembly process in an L-shaped configuration; alternatively, each L-shaped piece may comprise a hinged connection between the arms of the L, so that the piece can be packaged and delivered flat and then formed into the L-shape as part of the frame assembly process. In some embodiments, frame pieces may be brought to the assembly process as indefinite lengths from which individual frame pieces may then be separated, as described in U.S. Patent Application 2003/0172633 to Duffy.

In various embodiments, any suitable number of frame pieces may be used (e.g., one, two, three, or four). Regardless of the number of frame pieces 40', the pieces 40' may be positioned in the fixture e.g. so that inwardmost portions 60' of the pieces (i.e., portions that will eventually form downstream flange 60 of the finished frame) collectively comprise a rectangular, exposed (e.g., upward-facing) surface 62' (that will eventually form inner surface 62 of downstream flange of assembled frame 40). (In this context, a portion 60' of a frame piece may be termed a downstream flange, even though such designation may only take full effect upon completion of the finished filter.) If desired, the pieces 40' may be positioned so that outwardmost portions 70' and 50' of each piece (that will eventually respectively form sidewall 70 and upstream flange 50 of the finished frame) extend generally upward, e.g. as depicted in FIG. 5, during the next step(s) of the assembly process (the positioning of support grill 80 and bonding of support grill 80 to the frame pieces). Alternatively, outward-most portions 70' and 50' may remain generally flat, as depicted in phantom lines in FIG. 5, during the next step(s) of the assembly process.

A support grill 80 may then be positioned so that at least outwardmost portions 86 proximate its perimeter 14 are in overlapping relation with at least some of portions 66' of inwardmost portions 60' of frame pieces 40' (e.g., portions that will eventually form inwardmost portion 66 of downstream flange 60 of finished frame 40). The support grill 80 may be brought into the assembly process as a precut piece; or, a length of support grill may be unwound into position from a roll good of support grill material and then cut to form a support grill of the appropriate size and shape. Regardless of how the placement of support grill 80 is achieved, support grill 80 can then be attached to the frame pieces to form an attached support grill. For example, at least overlapping portions 86 of support grill 80 may be attached to portions 60' of the frame pieces which will become portions of downstream flange 60 upon the completion of the finished frame 60 (i.e., with reference to FIGS. 5 and 3, upon the folding of portions 70' and 50' of frame pieces 40' around perimeter 14 of air filter media 10 to respectively form sidewall 70 and upstream flange 50).

A piece of air filter media 10 may then be positioned so that an inwardmost major portion 16 thereof is in overlapping relation with perforated inwardmost portion 90 of support grill 80 (and, e.g., so that at least perimeter 14 of air filter media 10 is in overlapping relation with at least some of portions 60' of frame pieces 40'). The air filter media 10 may be brought into the assembly process as a precut piece; or, a length of media may be rolled into position from a roll good of air filter media and then cut to form a piece of the appropriate size and shape. Regardless of how the placement of the air filter media 10 is achieved, air filter media 10 can then be attached to support grill 80 and/or to frame pieces 40'. For example, portions of air filter media 10 that overlap with portions of support grill 80 and/or with portions 60' of the frame pieces may then be attached to those portions of the support grill and/or the frame pieces. After this, portions 70' of frame piece 40' may be folded (e.g., along a fold location 77) so as to form sidewall 70 (if this has not already been done prior to the attaching of air filter media 10 to support grill 80 and/or frame pieces 40'); and, portions 50' of frame pieces 40' may be folded (e.g., along a fold location 76) inwardly over perimeter 14 of air filter media 10) so as to form upstream flange 50 of frame 40; both as indicated by the directional arrows in FIG. 5.

At this point attachment of the filter frame pieces to each other to form the finished frame 40 may be performed in full. That is, if no attachment of any of the frame piece portions to those of neighboring frame pieces has already been performed, any or all of frame piece portions 50', 60', or 70' may now be respectively attached to frame piece portions 50', 60', or 70' of neighboring frame pieces. Alternatively, at this point attachment of the filter frame pieces to each other may be completed. That is, if, earlier in the assembly process, attachment of portions 60' of frame pieces to portions 60' of neighboring frame pieces, and/or attachment of portions 70' of frame pieces to portions 70' of neighboring frame pieces, has already been performed, at this point, with portions 50' of frame pieces 40' now having now been folded into their final configuration, portions 50' of frame pieces may now be attached to portions 50' of neighboring frame pieces. (It will be appreciated that in the case that two frame pieces, e.g. two L-shaped pieces, are used, the two pieces will be neighbors to each other. In the case of four frame pieces, each frame piece will typically have two (nearest) neighbors to which it is attached).

Those of ordinary skill will appreciate that numerous variations of this basic process are possible. For example, at the time of attachment of support grill 80 and/or air filter media 10 to frame pieces 40', portions 60' of the frame pieces that will eventually form downstream flange 60 of the finished frame 40, may or may not have already been attached to each other so as to partially assemble the frame pieces into a frame. Additionally, at the time of attachment of support grill 80 and/or air filter media 10 to the frame pieces, portions 70' of the frame pieces that will eventually form sidewalls 70 of the finished frame may (as illustrated in FIG. 5) or may not (as illustrated in phantom in FIG. 5) have already been folded to form sidewalls 70. Still further, if portions 70' of the frame pieces have been folded so as to form sidewalls 70 (as shown in FIG. 5) prior to attachment of support grill 80 and/or air filter media 10 to the frame pieces, the sidewall-defining portions 70' of the individual frame pieces may or may not have already been attached to other, as desired, prior to the attachment of support grill 80 and/or air filter media to the frame pieces. Those of ordinary skill will appreciate that all such variations will fall within the inventive methods and articles defined herein.

While many variations of the above processes and operations are possible, it will be appreciated that the methods of making a framed air filter presented herein are fundamentally different from the conventional production of an air filter comprising e.g. a self-supporting air filter media. Those of ordinary skill will recognize that in the conventional production of an air filter incorporating a self-supporting air filter media, if any reinforcing element, strip, sheet, or the like is used, such an element is conventionally attached to the air filter media itself before the air filter media is optionally attached to a frame (or, alternatively viewed, before a frame is attached to the air filter media). In contrast, the herein-described methods involve the attachment of a support grill to a support frame (or, to at least some of the individual support frame pieces before the pieces have been attached to each other to form the finished support frame), with the attaching of an air filter media to either or both of those components only taking placed thereafter.

The various components mentioned herein may be attached to each other using any suitable methods and materials. For example, one or more adhesives may be used in attaching the frame pieces to each other, in attaching support grill 80 to the frame pieces, and/or in attaching the air filter media 10 to the support grill 80 and/or to the frame pieces. Such an adhesive or adhesives may already be present on a component (e.g., a frame piece, an air filter media, and/or a support grill) as it is delivered to the assembly process, or may be deposited thereon (e.g. coated, sprayed, etc.) as part of the assembly process. Such an adhesive or adhesives may be deposited only in certain desired locations or may be coated onto most or all of an inner surface of the component(s). Such an adhesive may be chosen from e.g. any of a pressure-sensitive adhesive, a hot-melt adhesive, a hardenable adhesive, a drying adhesive, and a photohardenable adhesive (recognizing that some adhesive compositions may fall into more than one of these categories). By a hardenable adhesive is meant an adhesive that solidifies by a chemical reaction (with or without liberation of small molecules), e.g. a moisture-cure silicone, an epoxy, and the like. By a drying adhesive is mean an adhesive that solidifies by the loss of a solvent and/or water, e.g. rubber cement, a water-based glue, and the like. By a photohardenable adhesive is meant one whose hardening is initiated or promoted by radiation (such as visible light, UV radiation, etc.), e.g. the well-known UV-curable adhesives and the like.

In various embodiments, such an adhesive may e.g. be coated onto the entirety of the surfaces of frame pieces that will eventually become the inner surfaces of sidewall 70 and upstream and downstream flanges 50 and 60. Likewise, an adhesive may be applied to the inner surface 82 of support grill 80, e.g. only in an area proximate the perimeter 81 of support grill 80 (e.g., onto inner surface 82 of at least a portion of continuous border frame 85 of support grill 80), to facilitate the bonding of border portion 15 of air filter media 10 thereto. Alternatively, an adhesive may be applied to the entirety of the inner surface 82 of support grill (that is, over the entire length and width of support grill 80, including areas within perforated area 90 of support grill 80). This may provide that air filter media 10 is bonded to support grill 80 in at least some portions of area 16 of air filter media 10 (as opposed to air filter media 10 being bonded to support grill 80 and/or to support frame 40 only in areas proximate perimeter 14 of air filter media 10). However, it may not necessarily be required to provide such bonding within perforated area 16 of air filter media 10. That is, in some embodiments the solid portions of support grill 80 within perforated area 90 of support grill 80 need not necessarily be bonded to air filter media 10. In fact, they need not necessarily be in contact with air filter media 10 except at such times as air filter media is 10 is pressed downstream against support grill 80 under the pressure of forced air flow.

In specific embodiments of the type illustrated in exemplary manner in FIG. 3, in which an inwardmost portion 66 of inner surface 62 of downstream flange 60 is bonded to support grill 80, with an outwardmost portion of surface 62 of downstream flange 60 left exposed so as to be bondable to air filter media 10, air filter media 10 may be adhesively bonded to downstream flange 60 in addition to, or instead of, being bonded to support grill 80. Furthermore, if air filter media extends to inner surface 72 of sidewall 70 (again as shown in FIG. 3), air filter media 10 may be bonded to surface 72 as well.

Those of ordinary skill will appreciate that if adhesives are used for some or all of the above-described attaching of various components to each other, each adhesive may or may not take the form of a continuous layer (which might prevent the components from directly contacting each other). It will further be appreciated that in instances herein in which an order of performing assembly steps (e.g. attachments, etc.) is specified, in the case of using an adhesive for a bonding step the adhesive may not necessarily need to have completely solidified before the next step in the assembly process is begun.

Instead of, or as an adjunct to, the use of one or more adhesives, any or all of the above-mentioned attachments can be performed by mechanical fasteners. While any suitable means may be used, staples and the like may be preferred for convenience. Such mechanical fasteners (e.g., staples) may typically press the surfaces of the components to be fastened, directly against each other.

It will further be appreciated that any of the above-described components may have various ancillary components, features, etc. to facilitate any of the above described operations (e.g., forming, folding, attaching operations, etc.). For example, one or more of the frame pieces may each comprise one or more tabs or the like, that may overlap a portion of an adjacent frame piece, so as to facilitate bonding thereto. Likewise, one or more of the frame pieces may comprise one or more slots that are configured to receive a terminal end of a neighboring frame piece, a tab thereof, or the like. It will also be appreciated that the frame pieces may comprise folding lines, lines of weakness, score lines, and the like, so as to facilitate such folding operations may be used to transform the frame pieces into a finished frame.

It will still further be appreciated that, although the discussions above have focused on the use of two or more frame pieces to form frame 40, in some embodiments frame 40 may be constructed from a single elongated frame piece which may be bent to form four edge portions (which portions collectively form a generally rectangular shape), with the two terminal ends of the frame piece being attached to each other to form the frame. Such configurations are encompassed within the disclosures herein; in such cases, it will be appreciated that the above descriptions of frame 40, and of methods of manufacturing a filter comprising a frame 40 (e.g., folding portions to form sidewall 70 and upstream flange 50, etc.) will be applicable thereto. The main feature of such an embodiment will be that the process of attaching a terminal end of the single frame piece to a terminal end of its "nearest neighbor" piece in the process of making the frame, will simply be a specific case in which terminal ends of the same piece are attached to each other.

LIST OF EXEMPLARY EMBODIMENTS

Embodiment 1

A framed air filter, comprising a non-self-supporting air filter media comprising an upstream side and a downstream side and comprising a generally rectangular perimeter comprising four major edges; a support frame comprised of four support frame portions each portion being mounted on one of the four major edges of the non-self-supporting air filter media; and, a support grill adjacent the downstream side of the non-self-supporting air filter media and consisting of a single perforate sheet that is not integral with any portion of the support frame and that is attached to each of the four portions of the support frame.

Embodiment 2

The framed air filter of embodiment 1 wherein the support frame is a channel frame comprising at least a downstream flange at least a portion of which is in overlapping relation with at least a portion of the support grill and is attached thereto.

Embodiment 3

The framed air filter of embodiment 2 wherein the support grill comprises a continuous border frame at least an outwardmost portion of which is in overlapping relation with at least an inwardmost portion of the downstream flange of the support frame and is attached thereto.

Embodiment 4

The framed air filter of any of embodiments 2-3 wherein the support frame is comprised of four channel frame pieces, each channel frame edge piece being mounted on one of the four major edges of the non-self-supporting air filter media and being attached to two neighboring channel frame edge pieces.

Embodiment 5

The framed air filter of any of embodiments 2-3 wherein the support frame is comprised of two L-shaped channel frame pieces, each L-shaped channel frame piece being mounted on two adjoining major edges of the non-self-supporting air filter media, with the two L-shaped channel frame pieces being attached to each other at diagonally-opposing corners of the non-self-supporting air filter media.

Embodiment 6

The framed air filter of any of embodiments 2-5 wherein at least a portion of the downstream flange of the channel frame is in overlapping relation with at least a portion of a downstream surface of the non-self-supporting air filter media.

Embodiment 7

The framed air filter of any of embodiments 1-6 wherein at least a portion of the support grill is in contact with at least a portion of a downstream surface of the non-self-supporting air filter media and is adhesively bonded thereto.

Embodiment 8

The framed air filter of any of embodiments 1-7 wherein the non-self-supporting air filter media is adhesively bonded to the support frame and/or to the support grill.

Embodiment 9

The framed air filter of any of embodiments 1-8 wherein at least a perimeter portion of the non-self-supporting air filter media is in contact with an inner surface of a sidewall of the support frame and is adhesively bonded thereto.

Embodiment 10

The framed air filter of any of embodiments 1-9 wherein the non-self-supporting air filter media is a non-self-supporting pleated non-woven air filter media.

Embodiment 11

The framed air filter of embodiment 10 wherein the non-self-supporting air filter media comprises downstream pleat tips and wherein an upstream surface of the support grill is adhesively bonded to at least some of the downstream pleat tips of the non-self-supporting air filter media.

Embodiment 12

The framed air filter of any of embodiments 1-11 wherein the support frame and the support grill are both comprised of paperboard.

Embodiment 13

The framed air filter of any of embodiments 1-12 wherein the framed air filter is at least 40 centimeters by 40 centimeters in size as measured between two diagonally-opposing corners of the framed air filter.

Embodiment 14

The framed air filter of any of embodiments 1-13 wherein the entirety of the support grill consists of a single perforated planar sheet that does not contain any folded portions.

Embodiment 15

The framed air filter of any of embodiments 1-14 wherein at least a portion of a downstream flange of the channel frame that is distal to a sidewall of the channel frame, is pinched toward an upstream flange of the channel frame.

Embodiment 16

The framed air filter of any of embodiments 1-15 wherein an outer surface of the support frame exhibits printed air-flow information thereon, and wherein an outer surface of the support grill does not exhibit printed air-flow information thereon.

Embodiment 17

A method of making a framed air filter, comprising attaching outwardmost portions of a support grill to portions of at least two support frame pieces to which the outwardmost portions of the support grill are respectively adjacent and in overlapping relation, so as to form an attached support grill; positioning a non-self-supporting air filter media adjacent to, and in overlapping relation with, the attached support grill, and attaching at least outwardmost portions of the non-self-supporting air filter media to the attached support grill and/or to the at least two support frame pieces; folding the at least two support frame pieces around the outwardmost portion of the non-self-supporting air filter media so as to form channel frame pieces each with a sidewall and an upstream flange and a downstream flange; and, attaching each support frame piece to a neighboring support frame piece to form a frame.

Embodiment 18

The method of embodiment 17 wherein a portion of each support frame piece is attached to a portion of neighboring support frame piece prior to the support grill being attached to a support frame piece.

Embodiment 19

The method of any of embodiments 17-18 wherein the at least two support frame pieces are folded to form at least downstream flanges and sidewalls before the support grill is attached to the at least two support frame pieces.

Embodiment 20

The method of embodiment 19 wherein at least one downstream flange of at least one support frame piece is attached to a downstream flange of a neighboring support frame piece, and/or at least one sidewall of at least one support frame piece is attached to a sidewall of a neighboring support frame piece, before the support grill is attached to the at least two support frame pieces.

Embodiment 21

The method of embodiment 20 wherein after the support grill is attached to the at least two support frame pieces and the non-self-supporting air filter media is attached to the at least two support frame pieces and/or to the support grill, the at least two support frame pieces are then folded so as to form upstream flanges, after which the upstream flange of each support frame piece is attached to the upstream flange of at least one neighboring support frame piece, so that the support frame pieces collectively comprise a channel frame mounted to the perimeter of the non-self-supporting air filter media.

Embodiment 22

The method of any of embodiments 17-21 wherein the at least two support frame pieces are attached to each other, and the support grill is attached to the at least two support frame pieces, and the non-self-supporting air filter media is attached to the support grill and/or to the at least two support frame pieces, by way of one or more adhesives.

Embodiment 23

The method of any of embodiments 17-22 wherein the at least two support frame pieces are arranged to collectively form a generally rectangular shape and wherein the support grill is delivered to the assembly process as part of a roll good and wherein the method includes cutting a length of support grill from the roll good and positioning the support grill relative to the at least two arranged support frame pieces.

Embodiment 24

A method of making a framed air filter, comprising: positioning a support frame piece so that it comprises four edge portions arranged collectively in a generally rectangular shape; attaching outwardmost portions of a support grill to portions of the support frame piece to which the outwardmost portions of the support grill are respectively adjacent and in overlapping relation, so as to form an attached support grill; positioning a non-self-supporting air filter media adjacent to, and in overlapping relation with, the attached support grill, and attaching at least outwardmost portions of the non-self-supporting air filter media to the attached support grill and/or to the support frame piece; folding the support frame piece around the outwardmost portion of the non-self-supporting air filter media so as to form a sidewall and an upstream flange and a downstream flange; and, attaching a first terminal end of the support frame piece to a second terminal end of the support frame piece.

EXAMPLES

Working Examples

Framed air filters were made according to the following procedure. Non-self-supporting air filter media of the general type used to make air filters available from 3M Company, St. Paul, Minn., under the trade designation FILTRETE MICRO ALLERGEN 1000 was obtained as a roll good. Highly open wire mesh of the general type used to make FILTRETE MICRO ALLERGEN 1000 air filters was obtained as a roll good. A hot melt adhesive was applied to the wire mesh and the wire mesh was laminated to one surface of the air filter media. The wire mesh served mainly to allow the air filter media to be effectively pleated, and did not render the air filter media self-supporting. The air filter media was then pleated at a spacing of approximately 12 pleats per foot. Lengths of pleated laminate were then cut with a guillotine knife such that each piece of non-self-supporting pleated air filter media had 20 full pleats, and was approximately 19.75 inches wide (in the direction perpendicular to the individual pleats) and approximately 24.75 inches long (in the direction parallel to the individual pleats).

Individual frame pieces were obtained of the general type used to make FILTRETE ULTRA ALLERGEN 1500 filters, available from 3M Company, St. Paul, Minn. Each frame piece was flat as obtained, but had a living hinge oriented and positioned so that the frame piece could be formed into an L-shape. Additionally, each frame piece as obtained comprised two fold lines running generally along the long axis of the frame piece, such that the frame piece could be folded to form a channel frame piece with a sidewall (of a nominal thickness, in the direction of air flow through the finished filter, of about ¾ inch) with upstream and downstream flanges extending (to a nominal distance of about 1 and ⅛ inch) therefrom. The frame pieces were made of paperboard with a thickness of approximately 26 thousandths of an inch and comprised protruding tabs to facilitate adhesive bonding of the frame pieces to each other.

A support grill piece was obtained by cutting out the central portion (excluding the sidewall) of a box frame of the general type used to manufacture FILTRETE MICRO ALLERGEN 1000 air filters. The support grill was 24.75 inches long by 19.75 inches wide in nominal dimension (it was actually sized slightly less than these dimensions so that it could be easily dropped into the arranged frame pieces), and was made of paperboard with a thickness of approximately 28 thousandths of an inch. The support grill was similar in general appearance to support grill 80 of FIGS. 1 and 2, and comprised a continuous border frame that was approximately 1 inch in width around the entire perimeter of the support grill.

One surface of each of the frame pieces (that would eventually form the inner surfaces of the finished frame) and one surface of the support grill (that would eventually form the inner surface of the support grill of the finished air filter) were separately coated with water-borne, poly(vinyl alcohol) based glue using a roll coater obtained from the Schaeffer Machine Co., Deep River, Conn. Each of the two frame pieces was formed into an L-shape, and the two pieces were then placed into a fixture with nominal interior dimensions of approximately 24.75 inches by 19.75 inches. The two frame pieces were positioned so as to collectively form a rectangular structure with the (glue-coated) surfaces that would eventually form the inner surface of the downstream flange of the finished frame facing upwards. The frame pieces were each partially folded so that the portions that would eventually form the sidewall and upstream flange of the finished frame were protruding vertically upwards. Thus, the frame pieces were positioned in a configuration of the general type depicted in FIG. 5. The frame pieces contained protruding tabs (not shown) that facilitated adhesive bonding of the frame pieces to each other.

The support grill was placed into the fixture, within the glue-coated surface facing upwards, and with the continuous border frame overlapping, and in contact with, the upward-facing, glue-coated portions of the frame pieces. The piece of non-self-supporting air filter media was then placed into the fixture, and was contacted with the glue-coated surface of the support grill in both the continuous border frame as well as in areas of the inwardmost perforated area of the support grill. After this, the upwardmost-extending portion of each frame piece was folded down to overlap the perimeter of the non-self-supporting air filter media so that the glue-coated surface of this portion of these frame pieces was in contact with the upstream surface of the air filter media so as to bond thereto (in the general manner indicated by the solid arrow in FIG. 5).

The frame pieces were then held with weights while the glue dried and hardened thus bonding the air filter media to the support grill and to inner surfaces of the support frame, bonding the support grill to inner surfaces of the support frame, and bonding the pieces of the support frame to each other. (The air filter media extended sufficiently outward that at least some portions of its perimeter may have contacted, and bonded to, the glue-coated inner surfaces of the sidewall of the support frame, although the primary bonding of the air filter media was typically to the glue-coated inner surfaces of the upstream and downstream flanges.) The end result was a framed air filter of nominal size 20×25 inches and nominal thickness 1 inch, with the frame being a channel frame made of paperboard of thickness approximately 26 thousandths of an inch, and comprising a non-integral support grill that was made of paperboard of thickness approximately 28 thousandths of an inch and that was adhesively bonded to all four downstream flanges of the frame.

Comparative Examples

Framed air filters were made in similar manner as described above, but with single-piece conventional box frames of the type used to make FILTRETE MICRO ALLERGEN 1000 filters available from 3M Company. An entire surface of a box frame piece comprising an inwardmost perforated area, surrounded on each of four sides by a portion foldable to form a sidewall and a portion foldable to form an upstream flange (e.g., a box frame piece of the general type depicted in FIG. 1 of U.S. Patent Application Publication 2007/0294988), was coated with glue in similar manner as described above, was placed into a fixture, and the outermost portions were folded to extend vertically upward. A piece of non-self-supporting pleated air filter media of the general type described above was positioned into the fixture so that its perimeter overlapped and contacted the glue-coated surfaces of the box frame piece that would eventually form the inner surface of the downstream flange of the finished frame as well as the glue-coated portions of the inwardmost perforated area of the box frame piece. After this, the upwardmost-extending portions of the box frame piece were folded down to overlap the perimeter of the non-self-supporting air filter media so that the glue-coated surface of this portion of the box frame piece was in contact with the upstream surface of the air filter media so as to bond thereto.

The frame pieces were then held with weights while the glue dried and hardened thus bonding the air filter media to inner surfaces of the box frame piece, and to bond portions of the box frame piece to each other so as to maintain the box frame piece in a box frame configuration. The end result was a framed air filter of nominal size 20×25 inches and nominal thickness 1 inch, with the frame being a one-piece box frame made of paperboard of thickness approximately 28 thousandths of an inch and comprising a integral support portion (comprising a die-cut perforate area) of the same thickness.

Frame Strength Testing of Working Example and Comparative Example Air Filters

The Working Example and Comparative Example filters were tested for frame strength using a custom-made frame strength tester. The frame strength tester comprises an adjustable opening that can be sized and shaped to receive a test filter (e.g. of a given size and shape). A framed filter to be tested is placed in the opening of the frame strength tester with the perimeter of the filter resting on a flange (lip) of the frame strength tester opening, with the flange overlapping approximately 0.5 inch inward from each perimeter edge of the test filter. With the test filter in place in the opening, the frame tester attempts to draw air through the inwardmost area of the filter (i.e., the area not blocked by the frame) by means of a vacuum pump located downstream from the air filter. (Ambient pressure is maintained on the upstream side of the filter). In the test, the filter is completely covered on the upstream side with a piece of plastic film (e.g., 1-3 mil poly) that essentially prevents air from passing through the filter, and is thus representative of a very badly plugged filter. The pumping speed of the vacuum pump is set to provide an initial pressure differential of approximately 0.5 inches of water, and the filter is visually inspected for approximately 10 seconds. The pumping speed of the vacuum pump is then increased to provide a pressure differential of approximately 0.7 inches of water for 10 seconds during which the filter is again monitored. The pumping speed of the vacuum pump is then increased in increments of approximately 0.2 inches of water for durations of approximately 10 seconds, until the filter frame fails (defined as any buckling of the frame sufficient to be visible and/or to cause significant air leakage between the filter and the perimeter support of the tester). A pressure gauge mounted on the frame strength tester records the pressure differential in inches of water ("$H_2O$"); the pressure at the time of frame failure is recorded as the strength of the filter frame.

Results of the above testing of nominal 20×25 inch framed filters are presented in Table 1. Each data point represents the average of six separately made and tested samples.

TABLE 1

| Example | Frame Strength | Standard Deviation |
| --- | --- | --- |
| Working | 2.9" $H_2O$ | 0.35 |
| Comparative | 2.6" $H_2O$ | 0.38 |

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification and the disclosure in any document incorporated by reference herein, this specification will control.

What is claimed is:

1. A framed air filter, comprising:
a pleated, non-self-supporting air filter media comprising an upstream side and a downstream side and comprising a generally rectangular perimeter comprising four major edges;
a support frame comprised of four support frame portions each portion being mounted on one of the four major edges of the pleated non-self-supporting air filter media; and,
a support grill adjacent the downstream side of the pleated non-self-supporting air filter media and consisting of a single perforate sheet that is not integral with any portion of the support frame and that is attached to each of the four portions of the support frame,
wherein the support frame is an at least generally U-shaped channel frame comprising at least a downstream flange and an upstream flange that is oriented at least generally parallel to the downstream flange, and wherein at least a portion of the downstream flange is in overlapping relation with at least a portion of the support grill and is attached thereto.

2. The framed air filter of claim 1 wherein the support grill comprises a continuous border frame at least an outwardmost portion of which is in overlapping relation with at least an inwardmost portion of the downstream flange of the support frame and is attached thereto.

3. The framed air filter of claim 1 wherein the support frame is comprised of four channel frame pieces, each channel frame piece being mounted on one of the four major edges of the non-self-supporting air filter media and being attached to two neighboring channel frame edge pieces.

4. The framed air filter of claim 1 wherein the support frame is comprised of two L-shaped channel frame pieces, each L-shaped channel frame piece being mounted on two adjoining major edges of the non-self-supporting air filter media, with the two L-shaped channel frame pieces being attached to each other at diagonally-opposing corners of the non-self-supporting air filter media.

5. The framed air filter of claim 1 wherein at least a portion of the downstream flange of the channel frame is in overlapping relation with at least a portion of a downstream surface of the non-self-supporting air filter media.

6. The framed air filter of claim 1 wherein at least a portion of the support grill is in contact with at least a portion of a downstream surface of the non-self-supporting air filter media and is adhesively bonded thereto.

7. The framed air filter of claim 1 wherein the non-self-supporting air filter media is adhesively bonded to the support frame and/or to the support grill.

8. The framed air filter of claim 1 wherein at least a perimeter portion of the non-self-supporting air filter media is in contact with an inner surface of a sidewall of the support frame and is adhesively bonded thereto.

9. The framed air filter of claim 1 wherein the non-self-supporting air filter media comprises downstream pleat tips and wherein an upstream surface of the support grill is adhesively bonded to at least some of the downstream pleat tips of the non-self-supporting air filter media.

10. The framed air filter of claim 1 wherein the support frame and the support grill are both comprised of paperboard.

11. The framed air filter of claim 1 wherein the framed air filter is at least 40 centimeters by 40 centimeters in size as measured between two diagonally-opposing corners of the framed air filter.

12. The framed air filter of claim 1 wherein the entirety of the support grill consists of a single perforated planar sheet that does not contain any folded portions.

13. The framed air filter of claim 1 wherein an outer surface of the support frame exhibits printed air-flow information thereon, and wherein an outer surface of the support grill does not exhibit printed air-flow information thereon.

14. The framed air filter of claim 1 wherein the support frame is a channel frame that is assembled from two or four channel frame pieces.

* * * * *